(12) United States Patent
Sumitomo et al.

(10) Patent No.: US 11,076,601 B2
(45) Date of Patent: Aug. 3, 2021

(54) PHYTOSANITARY COMPOSITION

(71) Applicants: BIOBOON LIMITED, Hong Kong (HK); Laurent Dumortier, Le Teich (FR)

(72) Inventors: Yamaji Sumitomo, Tokyo (JP); Laurent Dumortier, Le Teich (FR)

(73) Assignee: BIOBOON LIMITED, Hong Kong (HK)

(*) Notice: Subject to any disclaimer, the term of this patent is extended or adjusted under 35 U.S.C. 154(b) by 223 days.

(21) Appl. No.: 16/065,437

(22) PCT Filed: Dec. 22, 2016

(86) PCT No.: PCT/EP2016/082466
§ 371 (c)(1),
(2) Date: Jun. 22, 2018

(87) PCT Pub. No.: WO2017/109124
PCT Pub. Date: Jun. 29, 2017

(65) Prior Publication Data
US 2019/0289855 A1    Sep. 26, 2019

(30) Foreign Application Priority Data

Dec. 23, 2015 (FR) ..................... 15/63194

(51) Int. Cl.
| | | |
|---|---|---|
| *A01N 63/10* | (2020.01) | |
| *A01N 65/08* | (2009.01) | |
| *A01N 65/20* | (2009.01) | |
| *A01N 65/22* | (2009.01) | |
| *A01N 65/40* | (2009.01) | |
| *A01N 65/44* | (2009.01) | |
| *C05F 3/00* | (2006.01) | |
| *C05F 11/00* | (2006.01) | |
| *C05F 17/00* | (2020.01) | |
| *C05F 17/10* | (2020.01) | |
| *C05G 3/60* | (2020.01) | |

(52) U.S. Cl.
CPC .............. *A01N 63/10* (2020.01); *A01N 65/08* (2013.01); *A01N 65/20* (2013.01); *A01N 65/22* (2013.01); *A01N 65/40* (2013.01); *A01N 65/44* (2013.01); *C05F 3/00* (2013.01); *C05F 11/00* (2013.01); *C05F 17/00* (2013.01); *C05F 17/10* (2020.01); *C05G 3/60* (2020.02); *Y02A 40/20* (2018.01); *Y02P 20/145* (2015.11); *Y02W 30/40* (2015.05)

(58) Field of Classification Search
None
See application file for complete search history.

(56) References Cited

FOREIGN PATENT DOCUMENTS

| | | | |
|---|---|---|---|
| CN | 104072228 A | | 10/2014 |
| CN | 104230403 A | * | 12/2014 |
| CN | 104230403 A | | 12/2014 |
| CN | 104311359 A | | 1/2015 |
| CN | 104649813 A | | 5/2015 |
| CN | 105111014 A | | 12/2015 |
| JP | 51057557 A | | 5/1976 |

OTHER PUBLICATIONS

Rajhel, Cindy(50 Homemade Fertilizers and Soil Amendments: The Ultimate Collection of Easy, Drganic Recipes for Edible Gardens using Free and Recycled Materials, Home Grown Fun Garden Series Book one), Jan. 1, 2014, pp. 1-207 (Year: 2014).*
International Search Report and Written Opinion for International Application No. PCT/EP2016/082466 dated Jan. 18, 2017 (3 pages).
Rajhel, Cindy: "50 Homemade Fertilizers and Soil Amendments: The Ultimate Collection of Easy, Organic Recipes for Edible Gardens using Free and Recycled Materials", Home Grown Fun Garden Series (Book one), Jan. 1, 2014 (Jan. 1, 2014), pp. 1-207, Retrieved from the Internet: URL: http://www.homegrownfun.com/wp-content/uploads/50-Homade-Fertilizers-and-Soil-Amendments-eBook-copyright-HOME-GROWN-FUN-2014.pdf [retrieved on Apr. 14, 2016].

* cited by examiner

*Primary Examiner* — Alton N Pryor
(74) *Attorney, Agent, or Firm* — Cantor Colburn LLP

(57) ABSTRACT

The invention concerns a combination of ingredients comprising a fraction of palm, a fraction of bamboo, a fraction of an aquatic plant, a fraction of tropical forest tree, milk, feather and urine and/or earthworm excrements, said ingredients having undergone fermentation, as well as its use as phytosanitary composition and in particular fertilizer and the manufacture of a sanitary composition.

17 Claims, No Drawings

PHYTOSANITARY COMPOSITION

CROSS REFERENCE TO RELATED APPLICATIONS

This application is a National Stage of PCT Application No. PCT/EP2016/082466 filed on Dec. 22, 2016, which claims priority to French Patent Application No. 15/63194 filed on Dec. 23, 2015, the contents each of which are incorporated herein by reference thereto.

TECHNICAL FIELD

The invention concerns an organic phytosanitary composition.

BACKGROUND

This phytosanitary composition is effective on all plants in general, on the legumes and fruit trees in particular, but also on the ornamental plants and large agricultural crops. This is due to its preferential absorption mode of the plant by its leaf array.

In the context of the present invention, a phytosanitary composition or a phytosanitary treatment principally acts as a fertilizer, but also a pesticide. It can be employed for healthy plants whereby it supplies nutrients essential to the growth of plants; it can also be used for diseased plants and/or plants infected by fungi, insects or any other pests, whereby it can act directly against said pests but also indirectly through its fertilizing activity which enables them to overcome their pathological conditions.

Compared to the mineral fertilization, the organic fertilization has the benefit of resorting to the biomass, inexhaustible and locally available resource, it does not present major risks of environmental pollution and it further allows to enrich the soils. However, the ingredients administered to the crops are not directly assimilated by the vegetables, and the organic fertilization requires a prior transformation of said ingredients into assimilable elements. This transformation is carried out by the microorganisms living in the soil, but this results in a difficult control of nutrition and a slow process.

According to the invention, the phytosanitary composition contains ingredients derived from the biomass, but whose aforementioned transformation is already involved.

The document CN104230403A describes an organic fertilizer intended to the crop of the legumes, based on fractions of palm, bamboo, moran or intsia, water hyacinth or water and alaska lentil, having undergone fermentation steps, causing a partial digestion of the initial biomass and thus facilitating the absorption of the nutritive elements by the fertilized vegetables.

We are always looking for more effective and bioassimilable fertilizer.

BRIEF SUMMARY

According to the invention, a combination of ingredients derived from the biomass which have been subjected to an at least partial digestion, having a high fertilizing activity, is provided.

Thus, the object of the present invention is a combination of ingredients comprising a fraction of palm, a fraction of bamboo, a fraction of an aquatic plant, a fraction of tropical tree, milk, feather and urine and/or earthworm excrements, said ingredients having undergone fermentation. Each fraction naturally brings its elements which, during the fermentation, are at least partially, preferably totally, transformed and is thus present at least partially, or even totally, in the combination of the invention, in an assimilable form by the vegetables.

According to the present invention, it is meant by fraction of a tree, and in particular palm, bamboo and tropical tree, a fraction of any element of a tree and in particular of a root, trunk, branch, twig, leaf, fruit, bark, as well as mixtures of said elements. A fraction of a said tree can be obtained by one or several treatment(s) chosen from the grinding, drying, dehydration, desiccation, heating, extraction, fermentation. Advantageously, it is obtained by extraction.

DETAILED DESCRIPTION

By way of illustration, an extraction method suitable for obtaining a fraction of a tree is described below:

The vegetable raw material chosen from the aforementioned elements is cut into small pieces, for example of the order of 300 to 600 mm long and 200 to 400 mm wide. The pieces are placed in an extractor which is loaded with water. The temperature is raised to about 650-800° C. and the mixture is stirred at a rotation speed of 1200-1600 rpm, for about 120-180 minutes. The stirring is stopped and the temperature is lowered to −25 to −40° C. The mixture is again subjected to a stirring of 1200-1600 rpm, for about 120-180 minutes, at the end of which it is left to rest. The liquid is extracted from the mixture to obtain an essence. An essence is a preferred fraction.

The contribution of each of the fractions in the combination is more precisely the following:

The fraction of palm after fermentation contains lipoic acids; the preferred fractions of palm are essential oils or essences obtained by extraction, in particular by distillation or expression, of the wood, the leaves, the fruit pulp, the fruit stalk, the vegetable oil, the extraction residues of the oil mills after pressing.

The fraction of bamboo naturally contains a molecule with antibiotic and insecticidal activity; the preferred fractions of bamboo are essential oils or essences obtained by extraction, in particular by distillation or expression, of wood, leaves, shoots, vinegar.

The fraction of aquatic plant naturally contains probiotics and enzymes;

The fraction of tropical tree naturally contains enzymes; the preferred fractions of tropical tree are essential oils or essences obtained by extraction, in particular by distillation or expression, of wood for example.

The fraction of palm can be derived from any palm, in particular any plant of the family of Arceaceae, such as the date palm (or *Phoenix dactylifera*), the oil palm (or *Elaeis guineensis*), the queen palm (or *Syagrus romanzoffiana*), the palm kernel of the mountains (or *Prestoea montana*), the bamboo palm (or *Rhapis excelsa*), the species of the genus *Ccoccothrinax*, such as *Ccoccothrinax alta*, and Paurotis de Wright (or *Acoelorrhaphe wrightii*).

The fraction of bamboo can be derived from any bamboo, in particular from any plant of the Poaceae family. Within this family, there are the *Fargesia* group, whose *Fargesia nitida* is a representative, the *Phyllostachys* group like the *Phyllostachys nuda*, the *Sasale* group, and any other type of bamboo.

It is meant by tropical tree, the endemic trees of regions including tropical forests. In an advantageous variant of the invention, the tropical tree is chosen from meranti, jati, merbau, bengkirai, teak, mengkulang, merawang, batu and jyatok.

According to the present invention, it is meant by fraction of a plant, and in particular an aquatic plant, a fraction of any element of a plant and in particular of root, rod, twig, leaf, bud, flowers, as well as mixtures of said elements. A fraction of a plant can be obtained by one or several treatment(s) such as extraction of all or part of the plant, and in particular by hot or cold extraction.

It is meant by aquatic plant or macrophyte, a plant visible to the naked eye having the capacity to live in the water or in the vicinity of water bodies. In an advantageous but not restrictive variant of the invention, the aquatic plant is chosen from the lenticules, the algae, the floating-leaved plants, the submergent plants, the emergent plants, the lotus, the exotic aquatic plants.

The milk may be that of any mammal, in particular bovine, goat, sheep. Preferably, goat milk is used.

The fraction of the feather can be derived from any feather in particular from chicken, duck, goose and any other bird. It is advantageously in the form of flour derived from the grinding of feathers.

According to the invention, it is meant by fermentation a maturation of the ingredients without contributions or gas or microorganism deprivation.

A combination of the invention, according to the ingredients and more particularly the used fractions of trees and plants, can be in a completely liquid form, otherwise, it can comprise a solid portion.

Further, a combination of the invention preferably satisfies the following characteristics, whether they are considered alone or arranged together:

The mass of the fraction of palm ranges from 35 to 39 g for one liter of the combination.

The mass of the fraction of bamboo ranges from 24 to 28 g for one liter of the combination.

The mass of the fraction of aquatic plant ranges from 16 to 20 g for one liter of the combination.

The mass of the fraction of tropical tree ranges from 15 to 19 g for one liter of the combination.

The mass of milk ranges from 14 to 18 g for one liter of the combination.

The feather mass ranges from 16 to 20 g for one liter of the combination.

The proportion of urine and/or earthworm excrements ranges from 80 to 200 ml for one liter of the combination.

According to a preferred variant of the invention, because of its fertilizing performances, a combination satisfies, for one liter, the following formulation: from 37.5 to 38.5 g of the fraction of palm, from 26 to 27 g of the fraction of bamboo, from 17 to 18.5 g of the fraction of aquatic plant, from 15 to 16.5 g of the fraction of tropical tree, from 15 to 16.5 g of milk, from 17.5 to 19 g of feather and from 90 to 100 ml of urine and/or earthworm excrements. Advantageously, the fraction of palm, the fraction of bamboo, the fraction of aquatic plant and/or the fraction of tropical tree are essences.

Another object of the invention is a phytosanitary composition which can be directly applied, comprising, as active principle, a combination of the invention as previously described. In a preferred variant, for the purposes of an easier and more appropriate application, the phytosanitary composition contains only the liquid portion of said combination if the latter includes a solid portion.

The invention also concerns the use of a combination of the invention as previously described as vegetable manure and/or soil conditioner.

A combination of the invention contains all the nutrients required for the growth of vegetables. In addition, the migration of these nutrients is immediate. An assimilation at the level of 95% of the combination by the treated vegetables is effectively observed.

The invention also provides a method for manufacturing a phytosanitary composition of the invention.

35 to 39 g of palm essence are mixed with 15 to 19 g of tropical tree essence and the mixture is fermented from 4 to 8 days;

Then, under stirring, 24 to 28 g of bamboo essence are added while mixing and the mixture is fermented from 2 to 6 days;

Then, under stirring, 16 to 20 g of aquatic plant essence are added while mixing and the mixture is fermented from 3 to 7 days;

Then, under stirring, 14 to 18 g of milk are added while mixing and the mixture is fermented from 3 to 7 days;

Then, under stirring, 16 to 20 g of feather powder are added while mixing and the mixture is fermented from 2 to 6 days;

Then, under stirring, 100 ml of a mixture of urine and earthworm excrements are added; then The mixture is fermented from 30 to 45 days;

We make up to one liter, preferably with water: and

The liquid portion is recovered.

Advantageously, in order to promote fermentation, the medium is agitated at each step.

A preferred phytosanitary composition consists of the liquid portion derived from the above fermentation. Preferably, this portion is recovered by appropriate filtration, possibly supplemented by any removal technique of any residue, ashes and coal. Said composition may be used after it is diluted in water, for example 1:150 or 1:300, and any intermediary dilution.

The invention also concerns any combination likely to be obtained according to the above method, in particular any combination as previously defined.

The example below illustrates the method for manufacturing a combination of the invention.

Example 1

A Method For Manufacturing a Combination and a Composition of the Invention

The masses of the constituents given below allow preparing one liter of the combination.

38.3 g of palm essence are mixed with 15.8 g of tropical tree essence and the mixture is fermented for five days. To promote fermentation, the medium is stirred every eight hours, for about two hours.

After five days, 26.6 g of bamboo essence are added while mixing and the mixture is fermented for two days. In order to promote fermentation, the medium is stirred every eight hours, for about two hours.

At the end of these two days, 17.9 g of aquatic plant essence are added while mixing and the mixture is fermented for three days. In order to promote fermentation, the medium is stirred every eight hours, for about two hours.

At the end of these three days, 15.8 g of goat's milk are added while mixing and the mixture is left standing for three days. In order to promote fermentation, the medium is stirred every eight hours, for about two hours.

At the end of these three days, 18.4 g of chicken feather powder are added while mixing and the mixture is fermented for two days. In order to promote fermentation, the medium is stirred every eight hours, for about two hours.

At the end of these two days, 100 ml of a mixture of urine and earthworm excrements are added while mixing.

The mixture is fermented for thirty days. In order to promote fermentation, the medium is stirred every two to four days, for about four hours.

The mixture is fermented from 30 to 45 days, then we make up to 1 liter with water.

In order to obtain a phytosanitary composition of the invention, the liquid portion is recovered, preferably by filtration.

The fermentation phases are performed at ambient temperature.

Example 2

Effectiveness of a Composition of the Invention

The effectiveness of a composition of Example 1 is assessed in palm trees which are infected by *Ganoderma zonatum*. *G. zonatum* is a fungus that infects the palm species causing butt rot and which is spread due to the spores that are released by the fungus on the soil. The nearby trees are contaminated on a radius of 3 km surrounding the affected tree thus affecting the entire plantation.

To date, there is no method for controlling such infection by *G. zonatum*.

In accordance with the present example, the assays are carried out on 15 palms with different levels of *G. zonatum* infection and exhibiting *G. zonatum* fruits, in the form of button or fruiting bodies and foliar symptoms such as multiple unopened spears, yellowing palm and small canopy.

The following table 1 illustrates the stage of infection of the assayed palms.

TABLE 1

| Palm | *Ganoderma* Fruits SWB | FB | Palm Foliage Colour Y | LG | G | Number of Bunch(es) | Drooping Fronds | Number of Unopened Spears | Dead Palms | Palm Fruiting | Observations |
|---|---|---|---|---|---|---|---|---|---|---|---|
| 1 | 7 | 8 | | 1 | | | YES | 4 | NO | NO | Very severe infection with *Ganoderma* |
| 2 | 2 | 6 | | 1 | | | YES | 5 | NO | NO | Tree is not fruiting for quite sometime |
| 3 | | 7 | | 1 | | | YES | 5 | NO | NO | Tree is not fruiting for quite sometime |
| 4 | 1 | 2 | | 1 | | | YES | 4 | NO | NO | |
| 5 | | 7 | | 1 | | 3 | YES | 6 | NO | YES | Tree is still fruiting at minimal, with upcoming *Ganoderma* |
| 6 | 3 | | | 1 | | | YES | 4 | NO | NO | Medium hole size |
| 7 | 2 | 14 | | 1 | | | YES | 4 | NO | NO | Very severe infection with *Ganoderma*, tree not stable, no mounting below tree with hole |
| 8 | 11 | 18 | | 1 | | | YES | 5 | NO | NO | condition of tree with *ganoderma* very severe, tree not stable, no mounting below tree with hole |
| 9 | | 4 | | 1 | | 1 | YES | 3 | NO | YES | Tree is still fruiting at its minimal |
| 10 | 5 | 1 | | 1 | | 3 | YES | 5 | NO | YES | Large hole size with SWB & FB |
| 11 | | 5 | | 1 | | | YES | 5 | NO | NO | |
| 12 | 3 | 5 | | 1 | | | YES | 4 | NO | NO | Large hole size with SWB & FB |
| 13 | 16 | 23 | | 1 | | | YES | 4 | NO | NO | Very severe infection with *Ganoderma* |
| 14 | 6 | 1 | 1 | | | | YES | 3 | NO | NO | Small hole size |
| 15 | | 16 | | 1 | | | YES | 7 | NO | NO | Very severe infection with *Ganoderma* |

SWB means small white button/FB means fruiting body
Y means yellow/LG means light green/G means green
Number of bunch(es): where a number is mentioned, the tree is still bearing fruiting bunches but at a minimal level
Drooping fronds correspond to leaves of the palm tree when they are infected by *Ganoderma*: they drop down, turn brown and eventually die.

The study was conducted during six months as follows:

The composition obtained in Example 1 is diluted in water to obtain a ratio 1:150 (v/v).

The composition of the invention is applied by spraying on the leaves and on the roots, and possibly directly on the fungus. Spraying is carried out on each tree, every two weeks during the first eight weeks, then monthly during the next four months. The treatment may be extended in case the fungal attack is too severe. It is decreased periodically when the tree starts to bear fruits.

After the fifth spraying, the following observations are made:
New roots emerge and begin to grow and life surrounding the trees increases
Palm spears begin to open After the tenth spraying, the following observations are made:
New roots extend;
Flowers and fruits are visible for 80% of the treated trees These observations are made in comparison with control infected trees which were no treated with any means.

The results for eight trees, expressed with what is observed are mentioned in the following table 2:

TABLE 2

| | Control Application | | Invention composition Application | |
|---|---|---|---|---|
| Tree | 5th | 10th | 5th | 10th |
| 1 | No fruit | Fallen | No fruit | Fruiting |
| 2 | No fruit | No fruit | No fruit | Fruiting |
| 3 | Fallen | Fallen | No fruit | Fruiting |
| 4 | Fruit | Decrease | No fruit | Min fruit |
| 5 | Fruit | Decrease | Fruit | Increase fruiting |
| 6 | No fruit | Fallen | No fruit | Fruiting |
| 7 | Fallen | Fallen | Fallen | Fallen |
| 8 | No fruit | No fruit | Fallen | Fallen |

The composition not only eradicates *Ganoderma* infection by also brings the trees back to life. As mentioned above, visible results on the fruiting of affected trees and within a year of treatment, the trees are able to fruit in their original form.

*Ganoderma* disease is one major problem for palm oil planters with no cure to date, whereas 40-50% of plantations are infected. This example evidences that a composition of the invention is successful for overcoming this infection.

The invention claimed is:

1. A phytosanitary composition comprising, as active principle, a combination of ingredients comprising an extract of palm, an extract of bamboo, an extract of an aquatic plant, an extract of tropical tree, milk, feather and urine and/or earthworm excrements, said ingredients having undergone fermentation, wherein, after fermentation, the extract of palm contains lipoic acids, the extract of bamboo contains at least one antibiotic molecule and/or one insecticidal molecule, the extract of aquatic plant contains probiotics and enzymes, and the extract of tropical tree contains enzymes.

2. The phytosanitary composition of claim 1, wherein the tropical tree is chosen from meranti, jati, merbau, bengkirai, teak, mengkulang, merawang, batu and jyatok.

3. The phytosanitary composition of claim 1, wherein the aquatic plant is chosen from lenticules, algae, floating-leaved plants, submergent plants, emergent plants, lotus, and exotic aquatic plants.

4. The phytosanitary composition of claim 1, wherein the phytosanitary composition is in liquid form and optionally comprises a solid portion.

5. The phytosanitary composition of claim 1, wherein the mass of the extract of palm ranges from 35 to 39 g for one liter of the combination.

6. The phytosanitary composition of claim 1, wherein the mass of the extract of bamboo ranges from 24 to 28 g for one liter of the combination.

7. The phytosanitary composition of claim 1, wherein the mass of the extract of aquatic plant ranges from 16 to 20 g for one liter of the combination.

8. The phytosanitary composition of claim 1, wherein the mass of the extract of tropical tree ranges from 15 to 19 g for one liter of the combination.

9. The phytosanitary composition of claim 1, wherein the mass of milk ranges from 14 to 18 g for one liter of the combination.

10. The phytosanitary composition of claim 1, wherein the feather mass ranges from 16 to 20 g for one liter of the combination.

11. The phytosanitary composition of claim 1, wherein the mass of urine and/or earthworm excrements ranges from 80 to 200 ml for one liter of the combination.

12. A phytosanitary composition comprising, as active principle, a combination of ingredients comprising an extract of palm, an extract of bamboo, an extract of an aquatic plant, an extract of tropical tree, milk, feather and urine and/or earthworm excrements, said ingredients having undergone fermentation wherein, for one liter of this combination, it comprises from 37.5 to 38.5 g of the extract of palm, from 26 to 27 g of the extract of bamboo, from 17 to 18.5 g of the extract of aquatic plant, from 15 to 16.5 g of the extract of tropical tree, from 15 to 16.5 g of milk, from 17.5 to 19 g of feather, and from 90 to 100 ml of urine and/or earthworm excrements.

13. The phytosanitary composition according to claim 12, wherein the phytosanitary composition contains only the liquid portion of said combination.

14. The phytosanitary composition of claim 12, wherein the tropical tree is chosen from meranti, jati, merbau, bengkirai, teak, mengkulang, merawang, batu and jyatok.

15. The phytosanitary composition of claim 12, wherein the aquatic plant is chosen from lenticules, algae, floating-leaved plants, submergent plants, emergent plants, lotus, and exotic aquatic plants.

16. A method for preparing a phytosanitary composition according to claim 1, comprising the following steps:
   35 to 39 g of extract of palm are mixed with 15 to 19 g of extract of tropical tree and the mixture is fermented from 4 to 8 days;
   then, under stirring, 24 to 28 g of extract of bamboo are added while mixing and the mixture is fermented from 2 to 6 days;
   then, under stirring, 16 to 20 g of extract of aquatic plant are added while mixing and the mixture is fermented from 3 to 7 days;
   then, under stirring, 14 to 18 g of milk are added while mixing and the mixture is fermented from 3 to 7 days;
   then, under stirring, 16 to 20 g of feather are added while mixing and the mixture is fermented from 2 to 6 days;
   then, under stirring, 100 ml of a mixture of urine and earthworm excrements are added;
   then the mixture is fermented from 30 to 45 days;
   then the volume is made up to one liter; and
   the liquid portion is recovered.

17. The method of claim 16, wherein the volume is made up to one liter with water.

* * * * *